United States Patent [19]
Gothe

[11] 4,340,945
[45] Jul. 20, 1982

[54] OPERATING APPARATUS FOR AN APPLIANCE OF A MOTOR VEHICLE

[75] Inventor: Diethard Gothe, North Eltham, Australia

[73] Assignee: VDO Adolf Schindling AG, Fed. Rep. of Germany

[21] Appl. No.: 115,774

[22] Filed: Jan. 28, 1980

[30] Foreign Application Priority Data

Mar. 9, 1979 [DE] Fed. Rep. of Germany ....... 2909258

[51] Int. Cl.[3] ........................ G04F 8/00; G04B 47/00; B62D 45/00; B60Q 1/00

[52] U.S. Cl. ........................................ 368/6; 368/10; 368/187; 307/10 R; 340/52 F; 200/44

[58] Field of Search ................. 368/6, 10, 69, 70, 187, 368/188, 190, 308, 319–321; 307/10 R; 200/44, 61.66; 340/52 F, 52 R

[56] References Cited

U.S. PATENT DOCUMENTS

| | | | |
|---|---|---|---|
| 1,692,878 | 11/1928 | Watts | 200/44 |
| 3,665,128 | 5/1972 | Schaad et al. | 200/44 |
| 3,703,704 | 11/1972 | Schiesterl et al. | 200/44 |
| 3,723,677 | 3/1973 | Arias | 200/61.66 |
| 3,768,247 | 10/1973 | Fujita | 368/187 |
| 4,022,017 | 5/1977 | Aoki et al. | 368/6 |
| 4,072,850 | 2/1978 | McGlynn | 340/52 F |
| 4,112,669 | 9/1978 | Kaneko | 368/187 |
| 4,179,876 | 12/1979 | Moriyama | 368/10 |
| 4,205,520 | 6/1980 | Shackford | 368/10 |
| 4,293,842 | 10/1981 | Tanaka et al. | 340/52 F |

*Primary Examiner*—Vit W. Miska
*Attorney, Agent, or Firm*—Eric P. Schellin

[57] ABSTRACT

An operating apparatus for an appliance with electrical indication, particularly an electric clock of a motor vehicle, wherein push-button switches for setting or otherwise controlling the appliance are switched to one of their operative and inoperative positions by a contact switch operated with a key, such as the ignition key of the motor vehicle.

10 Claims, 3 Drawing Figures

FIG. 1
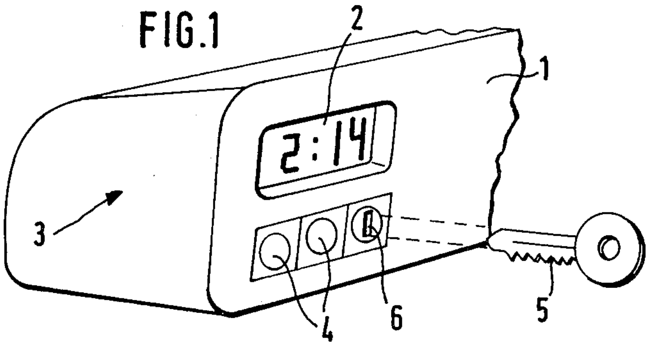
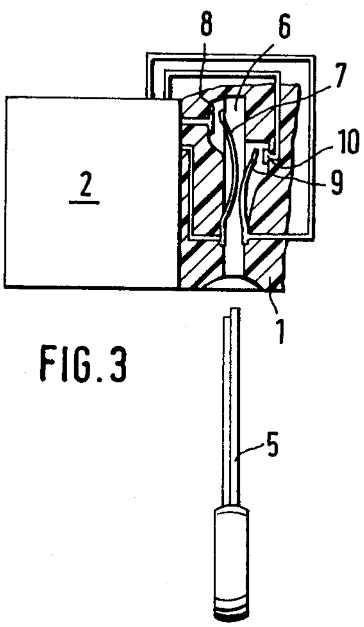
FIG. 3
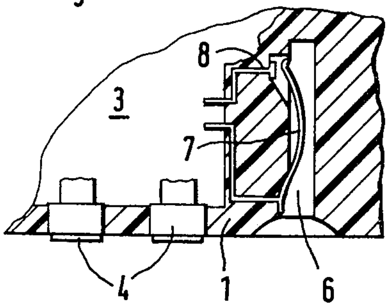
FIG. 2

OPERATING APPARATUS FOR AN APPLIANCE OF A MOTOR VEHICLE

BACKGROUND OF THE INVENTION

1. Field of the Invention

The invention relates to an operating apparatus for an appliance with electrical indication, particularly an electric digital clock, of a motor vehicle with at least one electric push-button switch.

2. Prior Art

Operating devices of this kind are provided in order to be able to set the electric indicator of an appliance in motor vehicles at prespecified values. Of two push-button switches known for digital clocks, e.g., one push-button switch serves for the program selection of the setting device, and the second push-button switch for the follow-up regulation of the indicator. Such push-button switches are located, possibly together with a digital clock, in the dashboard or a bracket of a motor vehicle, where also still further operating switches for other appliances and other functions, e.g., the illumination or the operation of a board calculator may be arranged. It is therefore possible that a push-button switch of such an appliance may be actuated by mistake whereby the indication data of the appliance will be altered in an undesired manner. This applies particularly when push-button switches are used as contact switches, since the latter respond with particular ease.

SUMMARY OF THE INVENTION

The purpose of the invention is, therefore, the prevention of a mistaken actuation of push-button switches, and complicated correction work connected therewith, so as to produce simple and reliable operating devices for appliances which cannot be actuated by mistake without purposeful procedure. A handling by unauthorized persons, e.g., playing children, is all the more to be avoided in these cases.

This purpose is achieved according to the invention by means of a structure wherein a contact switch that can be actuated by a key-like element is associated with the push-button switch of the appliance, by means of which contact switch at least one of the push-button switches can be switched to an operative or inoperative position. For instance, a clock adjustment device is secured by the contact switch to such an extent that the provided push-button switches respond only when the contact switch is actuated at the same time. This device makes an actuation of the clock adjustment or an alteration of the indication of another appliance possible only when the contact switch has been previously actuated with a key-like element.

A particularly advantageous embodiment of the invention consists in that the push-button switch that serves for block adjustment can be switched to the operative or inoperative position, because an adjustment of a digital clock, especially with contact switches, is very easy, but the subsequent correction is often very difficult.

A particularly advantageous development of the invention consists also in that the ignition key of the motor vehicle itself can be used for actuating the contact switch because it is subject to special control. Since the electric clocks, which are very accurate anyway, are to be rarely re-adjusted, it can be assumed that they can be adjusted only when the vehicle is at a standstill, and with sufficient concentration, when the ignition key is not needed. This is a safety feature which avoids an accident caused by lack of attention of a driver of the vehicle.

The contact switch is advantageously provided in the area of the push-button switch or switches. An advantageous or particularly simple version of the invention results from the fact that the contact switch contains at least one leaf spring which can be brought directly by means of the key-like element into an electric closure position to switch the push-button switch to an operative position and which, for the avoidance of unauthorized manipulation, is arranged so as to be concealed in a recess of the dashboard.

BRIEF DESCRIPTION OF THE DRAWINGS

Further developments of the invention are explained in greater detail with the aid of the embodiments shown in the drawings, wherein:

FIG. 1 is a perspective view of a portion of a vehicle dashboard with a digital clock and the operating switches;

FIG. 2 is a fragmentary section through the operating device of FIG. 1; and FIG. 3 is a section through another version of an operating device wherein the push-button switches are integrated into the contact switch.

DETAILED DESCRIPTION OF THE PREFERRED EMBODIMENTS

In the front side of a dashboard 1 there is the indicator 2 of a digital clock 3 which is adjustable by contact switches 4. Since contact switches 4 can be mistakenly actuated, provision is made, according to the invention, that contact switches 4 be switched to the operative position only when a key-like element is inserted in a recess 6 arranged in the immediate vicinity of contact switches 4.

As shown in greater detail in FIG. 2, a leaf spring 7 is provided in recess 6, which leaf spring comes to abut, when the ignition key of the motor vehicle is inserted, against a fixed contact 8 and thus establishes a conductive connection on which the contact switches 4 depend in a manner not shown.

FIG. 3 shows another version of the invention wherein the push-button switches are advantageously installed along with other elements in the contact switch consisting of contact spring 7 and fixed contact 8. An indicator 2, e.g., the visual display of a board calculator, can be actuated with an ignition key 5, e.g., by turning or tilting, by moving a further contact spring 9 toward a fixed contact 10. Such fixed contacts and contact springs can of course be arranged in several planes of the contact switch and actuated by a suitable movement of the key. It is also conceivable that a special key is provided for the actuation of the operating device when it is desired that the indication be also adjustable when the ignition key itself is employed for the normally provided purpose. It is, however, not advisable to adjust the very accurate electric clock of a motor vehicle, which is to be very rarely readjusted and which requires some concentration at a time when the attention of the driver is needed for the operation of his vehicle.

The invention can advantageously be utilized also in board calculators for motor vehicles wherein on the same indication the clock time can be shown. The push-button safety mechanism with a key serves in this case especially for securing the contents of stores which can be called upon by means of push-button switches against unauthorized or mistaken erasing. It is therefore conceivable to provide several separate key switches for several push-button switches.

I claim:

1. Operating apparatus for an appliance with electrical indication, particularly an electrical digital clock, of a motor vehicle with electric push-button switch means, said apparatus comprising a recess for receiving a normally detached key-like element, a contact switch comprising a movable electrical contact element and a cooperating fixed electrical contact element both associated with the electrical circuit controlled by said push-button switch, said movable contact element having at least a portion thereof positioned in said recess, whereby said key-like element when inserted into said recess into operative association with said movable contact element determines the state of operativeness of said electrical circuit which may be used to correct the indication of said electrical digital clock or other appliance and is controlled by said push-button switch.

2. Operating apparatus as in claims 1, wherein an ignition key of a motor vehicle is employed for the operation of the contact switch.

3. Operating apparatus as in claims 1, wherein the contact switch is arranged in the area of the push-button switch.

4. Operating apparatus as in claim 2, wherein the contact switch is arranged in the area of the push-button switch.

5. Operating apparatus as defined in claim 1 wherein the push-button switch means includes a push-button switch serving for adjustment of the clock time, said push-button switch being switchable selectively either to an operative or to an inoperative position.

6. Operating apparatus as defined in claim 1, wherein said contact switch comprises at least one leaf spring having at least a portion thereof positioned in said recess and constituting the movable contact element of said contact switch, whereby said key-like element when inserted into said recess into operative association with said leaf spring determines the state of operativeness of said electrical circuit controlled by said push-button switch.

7. Operating apparatus as defined in claim 2, wherein said contact switch comprises at least one leaf spring having at least a portion thereof positioned in said recess and constituting the movable contact element of said contact switch, whereby said key-like element when inserted into said recess into operative association with said leaf spring determines the state of operativeness of said electrical circuit controlled by said push-button switch.

8. Operating apparatus as defined in claim 1, wherein the contacts of the push-button switch are electrically connected to said contact switch, whereby said key-like element when inserted into said recess and into engagement with said movable contact element causes said push-button switch to become operational.

9. Operating apparatus as defined in claim 1 including a key-like element detachably positionable in said recess in operative association with said movable contact element.

10. Operating apparatus for an appliance with electrical indication, particularly an electrical digital clock, of a motor vehicle with electric push-button switch means, said apparatus comprising a recess for receiving a normally detached key-like element, two movable electrical contact elements each having at least a portion thereof positioned in said recess, a separate fixed electrical contact corresponding to each of said movable contact elements and adapted to be engaged by the respective movable contacts to complete a corresponding electrical circuit which may be used to correct the indication of said electrical digital clock or other appliance, said key-like element when inserted into said recess being adapted to engage each of said movable contact elements to move the respective movable contact elements into engagement with their corresponding fixed contacts.

* * * * *